US010345336B2

(12) United States Patent
Hirota et al.

(10) Patent No.: US 10,345,336 B2
(45) Date of Patent: Jul. 9, 2019

(54) SCANNING PROBE MICROSCOPE AND MEASUREMENT METHOD USING THE SAME

(71) Applicant: TOSHIBA MEMORY CORPORATION, Minato-ku, Tokyo (JP)

(72) Inventors: Jun Hirota, Kanagawa (JP); Tsukasa Nakai, Mie (JP); Haruko Akutsu, Kanagawa (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 225 days.

(21) Appl. No.: 15/252,993

(22) Filed: Aug. 31, 2016

(65) Prior Publication Data

US 2017/0269123 A1    Sep. 21, 2017

(30) Foreign Application Priority Data

Mar. 15, 2016 (JP) .................................. 2016-051367

(51) Int. Cl.
*G01Q 60/30* (2010.01)

(52) U.S. Cl.
CPC .................................. *G01Q 60/30* (2013.01)

(58) Field of Classification Search
CPC .............................. G01Q 10/00; G01Q 60/30
See application file for complete search history.

(56) References Cited

U.S. PATENT DOCUMENTS

| 6,094,971 A * | 8/2000 | Edwards ................ B82Y 35/00 |
| | | 73/105 |
| 8,001,831 B2 * | 8/2011 | Watanabe .............. B82Y 35/00 |
| | | 73/1.89 |

(Continued)

FOREIGN PATENT DOCUMENTS

| JP | 4693270 B2 | 6/2011 |
| JP | 5295047 B2 | 9/2013 |
| JP | 5295066 B2 | 9/2013 |

OTHER PUBLICATIONS

Chinone et al., "Cross-sectional dopant profiling and depletion layer visualization of SiC power double diffused metal-oxide-semiconductor field effect transistor using super-higher-order non-linear dielectric microscopy," J. Appl. Phys., vol. 116, 084509 (2014), pp. 084509-1-084509-7.

*Primary Examiner* — Nicole M Ippolito
*Assistant Examiner* — Sean M Luck
(74) *Attorney, Agent, or Firm* — Foley & Lardner LLP (57) ABSTRACT

A scanning probe microscope that includes a probe, a positioning unit configured to position a probe on a measurement sample, an excitation unit configured to excite the measurement sample at a predetermined frequency, a resonance unit configured to output a frequency modulation signal by converting a change of a capacitance of the measurement sample, a lock-in amplifier configured to output a differential capacitance signal obtained by extracting a predetermined frequency component and a harmonic component of the predetermined frequency of the demodulated signal, a conversion unit configured to output data indicative of a relationship between a voltage applied to the measurement sample and the capacitance, a detecting unit that detects a voltage value corresponding to a feature point of the relationship data, and a main measurement control unit that measures electrical characteristics of the measurement (Continued)

sample subjected to a DC bias voltage substantially equal to the feature point voltage.

12 Claims, 6 Drawing Sheets

(56) References Cited

U.S. PATENT DOCUMENTS

| | | | | |
|---|---|---|---|---|
| 2008/0314131 A1* | 12/2008 | Yasutake | .................... | B25J 7/00 73/105 |
| 2010/0263097 A1* | 10/2010 | Temirov | ................. | G01Q 30/10 850/26 |
| 2012/0227138 A1* | 9/2012 | Hirose | .................. | B82Y 35/00 850/1 |

\* cited by examiner

SCANNING PROBE MICROSCOPE AND MEASUREMENT METHOD USING THE SAME

CROSS-REFERENCE TO RELATED APPLICATION

This application claims the benefit of and priority to Japanese Patent Application No. 2016-051367, filed Mar. 15, 2016; the entire contents of which are incorporated herein by reference.

FIELD

An embodiment described herein relates generally to a scanning probe microscope and a measurement method using the same.

BACKGROUND

A scanning nonlinear dielectric microscope ("SNDM") can be used for observing charge distribution in a semiconductor region, polarization distribution of a dielectric, and the like at a nanoscale level. A measurement sample is two-dimensionally scanned with a probe of the SNDM. However, there can be stray capacitance and a floating inductor, which can lead to disturbance, between the probe and the measurement sample, and between a stage on which the measurement sample is placed and the measurement sample. Since the influence of the disturbance is superimposed on the differential capacitance detected by the probe, measurement sensitivity is lowered, or a measurement value becomes variable.

In addition, when a polishing process, an oxide film forming process, and the like are performed with respect to the measurement sample, there is a case where a surface of the measurement sample is charged. In this case, a charged state of the surface of the measurement sample is changed, and a measured C-V curve is shifted in a voltage direction. Accordingly, a differential capacitance signal detected in the SNDM is changed.

As described above, the SNDM has a feature which can detect a small capacitance change. Therefore, the SNDM is likely to be affected by the ambient environment. Measurement results obtained using the SNDM may vary from day to day even for the same measurement sample and may greatly depend on the ambient environment.

SUMMARY

According to some embodiments, there is provided a scanning probe microscope and a measurement method using the scanning probe microscope capable of accurately measuring electrical characteristics of a measurement sample with reduced impact by disturbance.

In some embodiments according to one aspect, a scanning probe microscope includes a probe, a positioning unit configured to position the probe on a measurement sample or a standard sample, an excitation unit configured to excite the measurement sample, the standard sample, or the probe at an excitation frequency, a resonance unit configured to output a frequency modulation signal obtained by converting a change of a capacitance of the measurement sample or the standard sample into a change of a resonant frequency, and a frequency demodulator configured to output a demodulated signal obtained by demodulating the frequency modulation signal. The scanning probe microscope further includes a lock-in amplifier configured to output a differential capacitance signal obtained by extracting a frequency component and a harmonic component of the excitation frequency included in the demodulated signal, a conversion unit configured to output relationship data indicative of a relationship between a voltage applied to the measurement sample or the standard sample and the capacitance, based on the differential capacitance signal, a feature point voltage detecting unit configured to detect a voltage value corresponding to a feature point of the relationship data, and a main measurement control unit configured to measure electrical characteristics of the measurement sample, by operating the excitation unit, the resonance unit, the frequency demodulator, and the lock-in amplifier, in a state where a DC bias voltage corresponding to the voltage value detected by the feature point voltage detecting unit is applied to the measurement sample.

In some embodiments according to another aspect, a measurement method using a scanning probe microscope includes exciting a measurement sample, a standard sample, or a probe, in a state where the probe is positioned on the measurement sample or the standard sample, generating a frequency modulation signal obtained by converting a change of a capacitance of the measurement sample or the standard sample into a change of a resonant frequency, generating a demodulated signal obtained by demodulating the frequency modulation signal, generating a differential capacitance signal obtained by extracting a frequency component and a harmonic component included in the demodulated signal, and generating relationship data indicative of a relationship between a voltage applied to the measurement sample or the standard sample and a capacitance, based on the differential capacitance signal. The measurement method using a scanning probe microscope further includes detecting a voltage value corresponding to a feature point of the relationship data, and measuring electrical characteristics of the measurement sample, based on the differential capacitance signal, by sequentially performing excitation of the measurement sample or the probe, generation of the frequency modulation signal, and generation of the differential capacitance signal, in a state where a DC bias voltage corresponding to the detected voltage value is applied to the measurement sample.

Other aspects and embodiments of the disclosure are also encompassed. The foregoing summary and the following detailed description are not meant to restrict the disclosure to any particular embodiment but are merely meant to describe some embodiments of the disclosure.

DETAILED DESCRIPTION

According to some embodiments, there is provided a scanning probe microscope and a measurement method using the scanning probe microscope capable of accurately measuring electrical characteristics of a measurement sample with reduced impact by disturbance.

Figure 1:
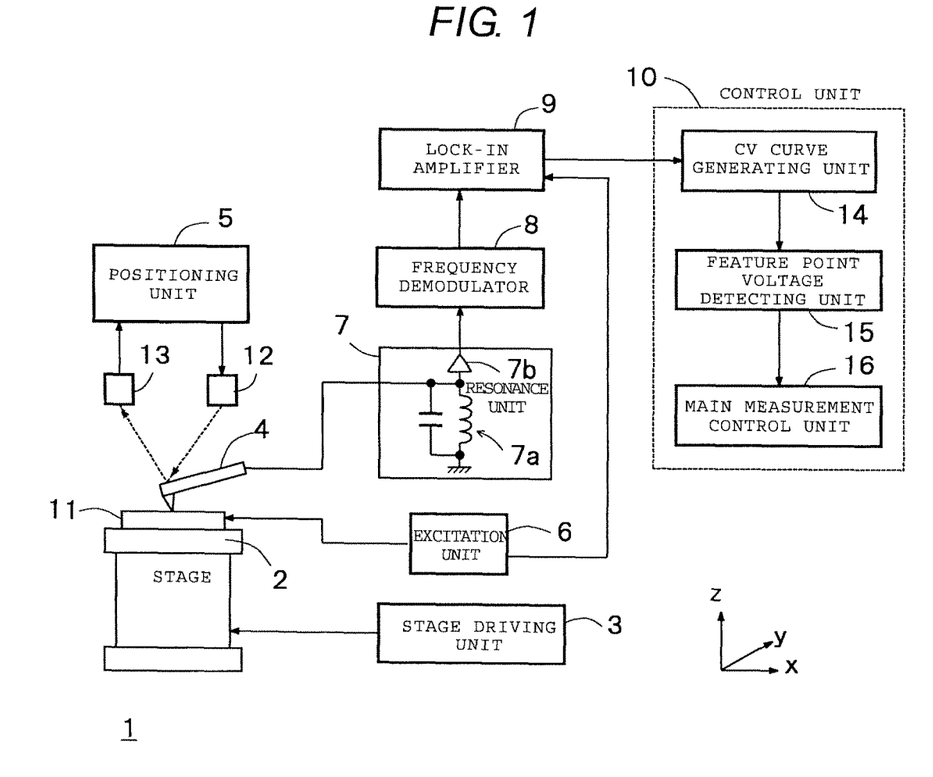
FIG. 1 is a block diagram illustrating a schematic configuration of a scanning probe microscope according to an embodiment.

Hereinafter, with reference to the drawings, an example embodiment will be described. FIG. 1 is a block diagram illustrating a schematic configuration of a scanning probe microscope 1 according to the embodiment. The scanning probe microscope 1 in FIG. 1 is a scanning nonlinear dielectric microscope (SNDM). FIG. 1 illustrates a characteristic configuration portion of the SNDM 1, and other configuration portions thereof are omitted.

The SNDM 1 in FIG. 1 includes a stage 2, a stage driving unit 3, a probe 4, a positioning unit 5, an excitation unit 6, a resonance unit 7, a frequency demodulator 8, a lock-in amplifier 9, and a control unit 10.

A measurement sample 11 can be placed on the stage 2. The stage driving unit 3 can move the measurement sample 11 on the stage 2 in the vertical direction (Z direction), and can adjust a distance between the measurement sample 11 and the probe 4. In addition, the stage driving unit 3 can move the measurement sample 11 on the stage 2 in the horizontal direction (XY direction). Instead of providing the stage driving unit 3, a driving unit that moves the probe 4 in an XYZ direction may be provided, and a position of the measurement sample 11 can be fixed. The probe 4 can be positioned on the measurement sample 11 or on a standard sample, or on a portion of the measurement sample 11 or on a portion of the standard sample, such that the probe 4 can engage with the measurement sample 11 or the standard sample.

A light emitting unit 12 that can irradiate the probe 4 with a laser light and a light receiving unit 13 that can receive a reflected light from the probe 4 are connected to the positioning unit 5. The positioning unit 5 can perform positioning of the probe 4, based on the laser light received in the light receiving unit 13.

The excitation unit 6 can excite the measurement sample 11 in the Z direction. More specifically, the excitation unit 6 can apply an alternating current (AC) voltage of a predetermined frequency to the measurement sample 11. With this, a capacitance of the measurement sample 11 is changed by a small capacitance.

The resonance unit 7 includes an LC resonance circuit 7a (including an inductor (L) and a capacitor (C)) and an amplifier 7b, and can convert the small change of the capacitance of the measurement sample 11 due to the excitation of the measurement sample 11 into a change of the resonant frequency. With this, the resonance unit 7 can output a frequency modulation signal of which a frequency is changed according to the small change of the capacitance. Since the resonance unit 7 is provided, it is possible to detect the small change of the capacitance of the measurement sample 11 as a change of the frequency.

The frequency demodulator 8 can output a demodulated signal obtained by demodulating the frequency modulation signal. The demodulated signal can be a voltage signal. The lock-in amplifier 9 can output a differential capacitance signal obtained by extracting a predetermined frequency component included in the demodulated signal and the harmonic components of the frequency component. The differential capacitance signal can be represented by the following equation (1).

$$\Delta C(t) = \sum_{n=1} (\Delta C_n \cos n\omega_p t + \Delta C_n \sin n\omega_p t) \quad (1)$$

Since Equation (1) is a function of the frequency, it is possible to perform Fourier series expansion as represented in Equation (2).

$$\Delta C(t) = \frac{dC}{dV} V_p \cos \omega_p t + \frac{1}{4} \frac{d^2 C}{dV^2} V_p^2 \cos 2\omega_p t + \quad (2)$$
$$\frac{1}{24} \frac{d^3 C}{dV^3} V_p^3 \cos 3\omega_p t + \frac{1}{192} \frac{d^4 C}{dV^4} V_p^4 \cos 4\omega_p t + \ldots$$

As represented in Equation (2), the differential capacitance signal has a high-order differential capacitance component with respect to a change due to the voltage of the capacitance. Equation (2) represents the high order differential capacitance component up to a fourth order. However, the differential capacitance signal output from the lock-in amplifier 9 also includes a differential capacitance component higher than the fourth order.

The control unit 10 can include a capacitance-voltage (CV) curve generating unit 14, a feature point voltage detecting unit 15, and a main measurement control unit 16. The CV curve generating unit (conversion unit) 14 can generate data, such as a CV curve, representing a relationship between an applied voltage to the measurement sample 11 and a capacitance, based on the differential capacitance signal. Generally speaking, the conversion unit 14 can output data representing a relationship between the applied voltage to the measurement sample 11 and the capacitance, based on the differential capacitance signal. The feature point voltage detecting unit 15 can detect a voltage value corresponding to a feature point on the CV curve. The main measurement control unit 16 can operate the excitation unit 6, the resonance unit 7, the frequency demodulator 8, and the lock-in amplifier 9, and can measure electrical characteristics of the measurement sample 11, in a state where a voltage substantially equal to the voltage detected in the feature point voltage detecting unit 15 is applied to the measurement sample 11 as a direct current (DC) bias voltage. In the description of some embodiments, when referring to two values or characteristics as being substantially the same or equal, the terms can refer to a first value or characteristic being precisely the same or equal to a second value or characteristic, as well as cases where the first value or characteristic is within a range of variation of less than or equal to ±5% of the second value or characteristic, such as less than or equal to ±4%, less than or equal to ±3%, less than or equal to ±2%, or less than or equal to ±1%. The measured electrical characteristics include, for example, the charge distribution, the carrier concentration distribution, and the like within the measurement sample 11. The control unit 10 can be implemented in hardware using associated circuits, such as a CV curve generating circuit, a feature point voltage detecting circuit, and a main measurement control circuit. Functionality of the control unit 10 also can be implemented using a processor and a memory (or other non-transitory computer-readable storage medium) storing instructions executable by the processor.

Figure 2A:
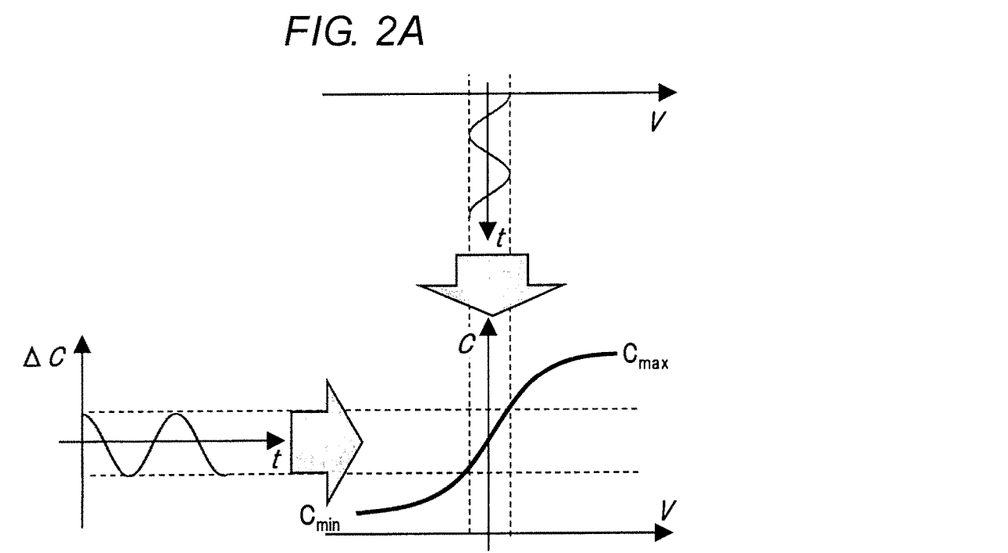
FIG. 2A is a waveform diagram of a differential capacitance when an amplitude of an AC voltage is small.
Figure 2B:
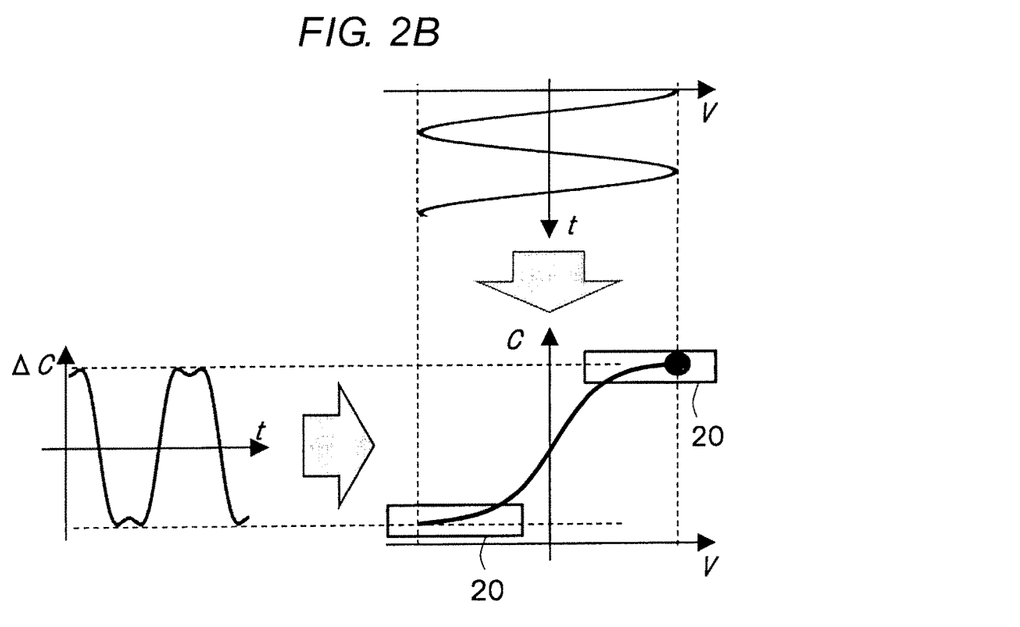
FIG. 2B is a waveform diagram of the differential capacitance when the amplitude of the AC voltage is greater than that in FIG. 2A.

Here, an amplitude of the AC voltage applied to the measurement sample 11 by the excitation unit 6 should be large enough to allow for obtaining a significant portion of the CV curve, as explained below. FIG. 2A is a waveform diagram of the differential capacitance ΔC when the amplitude of the AC voltage is small, and FIG. 2B is a waveform diagram of the differential capacitance ΔC when the amplitude of the AC voltage is greater than that in FIG. 2A.

When the amplitude of the AC voltage is small, as illustrated in FIG. 2A, although the waveform distortion of the differential capacitance ΔC is small, a differential capacitance ΔC corresponding to an approximately linear region in the center portion of the CV curve is obtained. Meanwhile, when the amplitude of the AC voltage is great, as illustrated in FIG. 2B, although the waveform of the differential capacitance ΔC in the peak value is distorted, the differential capacitance ΔC corresponding to the entirety of regions including both ends 20 of the CV curve is obtained.

The CV curve generating unit 14 can obtain the differential capacitance component up to a high order differential capacitance component higher than that of the differential capacitance signal represented in the above-described Equation (2), and can generate the CV curve. With this, the characteristics of both end regions in the CV curve in FIG. 2B can be accurately reproduced. However, since the value of terms in Equation (2) becomes small as the order of the differential capacitance component is high, the CV curve can be generated by obtaining up to approximately the sixth order differential capacitance component for practical purposes. However, generating a CV curve by obtaining up to first, second, third, fourth, fifth, seventh, eighth, ninth, tenth, or other order terms may be appropriate in some circumstances.

Figure 3:
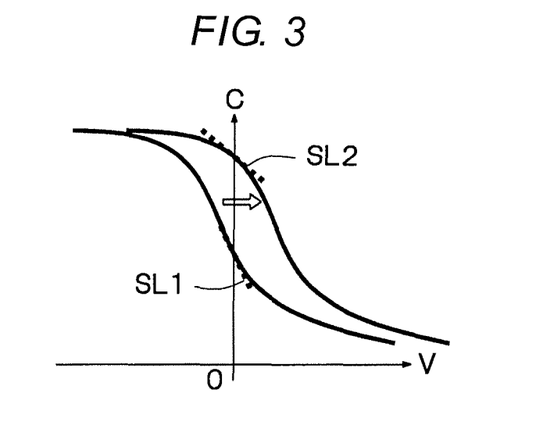
FIG. 3 is a diagram illustrating an example in which a CV curve of a measurement sample is shifted in a voltage direction due to charging of a surface.

When a surface of the measurement sample 11 is charged due to the influence of the disturbance in the periphery of the measurement sample 11, as described above, there is a possibility that the CV curve is shifted in the voltage direction. FIG. 3 illustrates an example in which the CV curve of the measurement sample 11 is shifted in the voltage direction due to the charge of the surface. In this case, a slope SL1 of the CV curve is changed into a slope SL2 at a voltage zero. That is, this means that the differential capacitance signal output from the lock-in amplifier 9 is changed such that the electrical characteristics of the measurement sample 11 may not be precisely measured. Accordingly, in the embodiment, when the measurement of the electrical characteristics of the measurement sample 11 is performed in the SNDM 1, a voltage shift amount of the CV curve can be detected, and, in a state where a DC bias voltage set based on the detected voltage shift amount is applied to the measurement sample 11, then the measurement of the SNDM 1 is performed.

Figure 4:
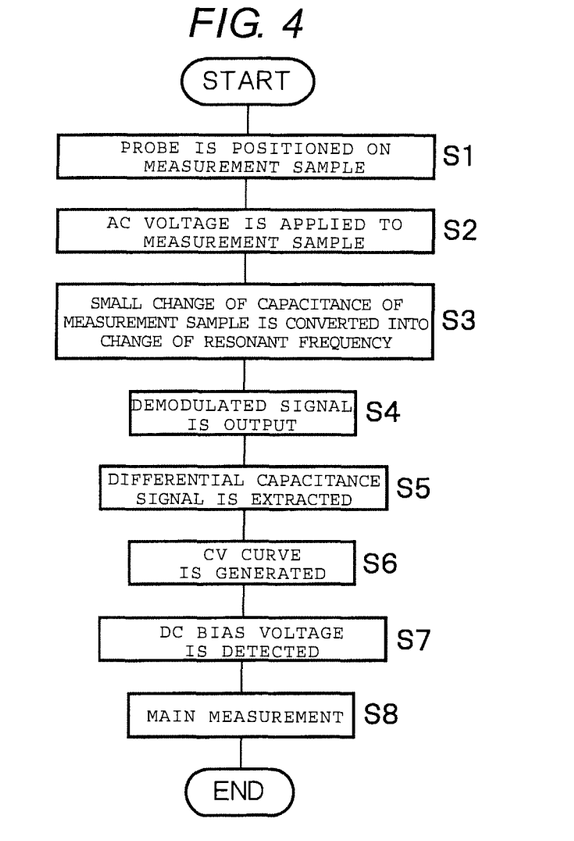
FIG. 4 is a flowchart illustrating a procedure of a measurement using the SNDM in FIG. 1.

FIG. 4 is a flowchart illustrating an example measurement procedure by the SNDM 1 in FIG. 1. First, the measurement sample 11 is placed on the stage 2, and by using the positioning unit 5, the probe 4 is positioned on the measurement sample 11 (step S1). Next, the AC voltage is applied to the measurement sample 11 by the excitation unit 6 (step S2). Next, a small change of the capacitance of the measurement sample 11 due to the application of the AC voltage to the measurement sample 11 is converted into a change of the resonant frequency in the resonance unit 7 (step S3). The resonance unit 7 outputs the frequency modulation signal that is converted from the resonant frequency according to the small change of the capacitance of the measurement sample 11. The frequency demodulator 8 outputs the demodulated signal obtained by demodulating the frequency modulation signal output from the resonance unit 7 (step S4). Next, the lock-in amplifier 9 extracts the differential capacitance signal from the demodulated signal (step S5).

Next, the CV curve generating unit 14 within the control unit 10 generates the CV curve, by performing the inverse Fourier conversion of the differential capacitance signal (step S6). Here, "the generation of the CV curve" can include that the CV curve itself is drawn or generated, and also a function and a matrix corresponding to the CV curve are generated. Data underlying the generated CV curve, the function, and the matrix can each be considered to be relationship data indicative of a relationship between a voltage applied to the measurement sample or the standard sample and a capacitance. Next, the feature point voltage detecting unit 15 detects the DC bias voltage corresponding to a feature point on the CV curve (step S7). As described below, the feature point is a point suitable for offsetting the change of the CV curve due to the disturbance of the measurement sample 11.

Next, the main measurement control unit 16 controls the excitation unit 6, the resonance unit 7, the frequency demodulator 8, and the lock-in amplifier 9, and performs the measurement for measuring the electrical characteristics of the measurement sample 11, in a state where the DC bias voltage detected in step S7 is applied to the measurement sample 11 (step S8).

In above-described steps S1 to S7, an example in which the DC bias voltage is detected by using the measurement sample 11 is described. However, the DC bias voltage may be detected by using a standard or a reference sample having the same material and carrier concentration as the measurement sample 11, and a process of step S8 may be performed by replacing the standard sample on the stage 2 to the measurement sample 11. When the standard sample is used, the standard sample can be one in which a flat band voltage VFB between the standard sample and the probe is already obtained.

Figure 5A:
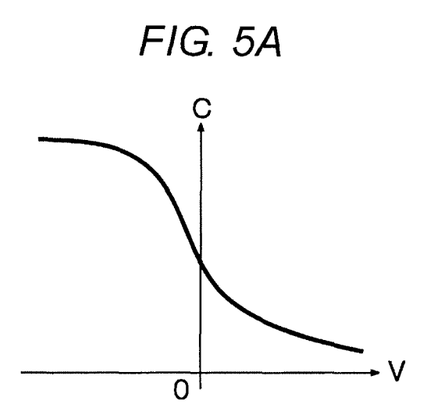
FIG. 5A is a diagram illustrating the CV curve when the measurement sample is a sample of an n-type semiconductor region.
Figure 5B:
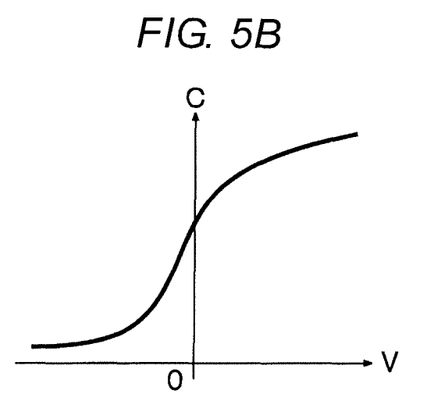
FIG. 5B is a diagram illustrating the CV curve when the measurement sample is a sample of a p-type semiconductor region.
Figure 5C:
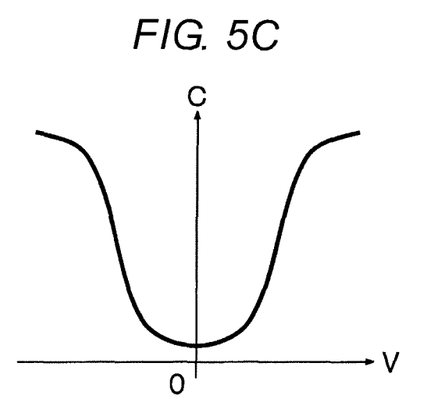
FIG. 5C is a diagram illustrating the CV curve when the measurement sample has a depletion layer.

A curve shape of the CV curve is different when the measurement sample 11 is a sample of an n-type semiconductor region, a sample of a p-type semiconductor region, or a sample having a depletion layer, respectively. FIG. 5A, FIG. 5B, and FIG. 5C illustrate the CV curves when the measurement sample 11 is the sample of the n-type semiconductor region, the sample of the p-type semiconductor region, and the sample having the depletion layer. The CV curve of the n-type semiconductor region becomes a curve shape in which the capacitance monotonically decreases according to the increment of voltage as illustrated in FIG. 5A. The CV curve of the p-type semiconductor region becomes a curve shape in which the capacitance monotonically increases according to the increment of voltage as illustrated in FIG. 5B. The CV curve of a case having the depletion layer becomes a curve shape having a minimum point in which the capacitance is minimized at a voltage illustrated in FIG. 5C.

Figure 6:
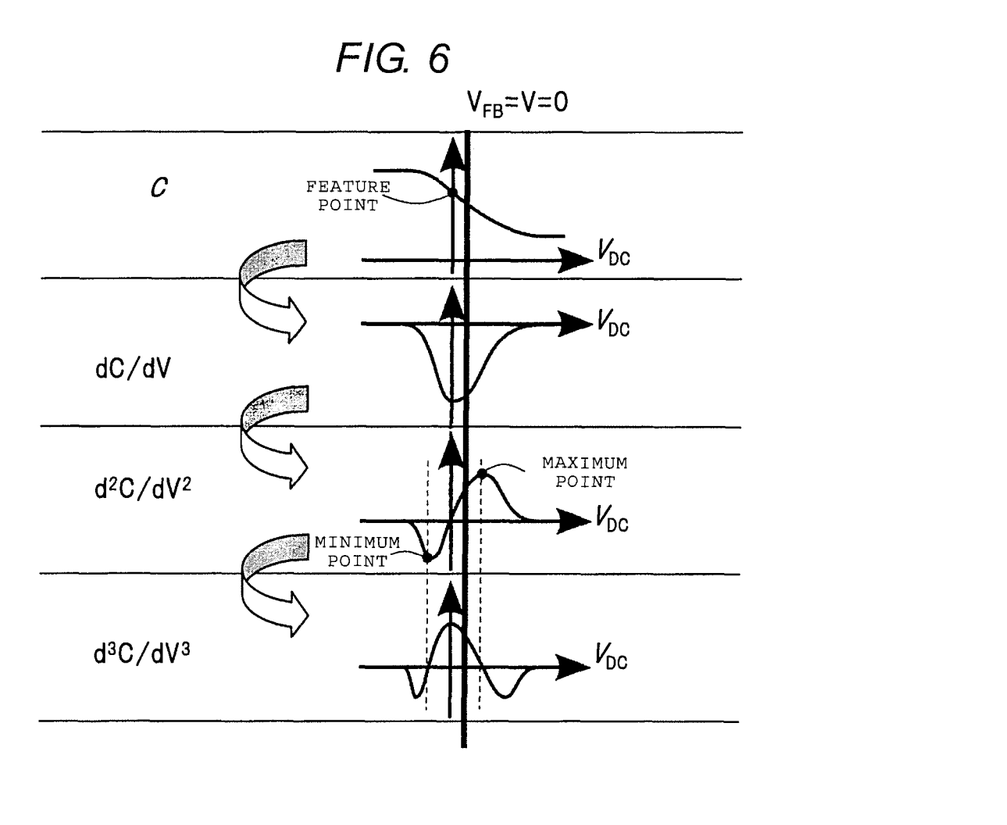
FIG. 6 is a diagram illustrating a process procedure of a feature point voltage detecting unit when the measurement sample is the sample of the n-type semiconductor region.

A process of the feature point voltage detecting unit 15 is different according to the curve shape of the CV curve generated in the CV curve generating unit 14. FIG. 6 is a diagram illustrating a processing procedure of the feature point voltage detecting unit 15 in a case where the measurement sample 11 is the sample of the n-type semiconductor region. FIG. 6 illustrates a first order differential curve, a second order differential curve, and a third order differential curve in a voltage of the CV curve. The feature point voltage detecting unit 15 detects a point, as the feature point, in which the first order differential curve becomes a minimum value and the second order differential curve becomes zero, and detects a corresponding voltage value as the DC voltage. The voltage value is equal to a point in which an absolute value of the slope of the CV curve is maximized, and is equal to an inflection point of the CV curve in another perspective.

The difference between the voltage value corresponding to the feature point and the zero voltage becomes a voltage to be applied as the DC bias voltage.

In practice, a point slightly shifted from the above-described points may be used as the feature point. That is, when the measurement sample 11 is the sample of the n-type semiconductor region, as illustrated in the curve in FIG. 6, the feature point can be set at a point between a maximum point and a minimum point of the second order differential curve of the CV curve.

Even when the measurement sample 11 is the sample of the p-type semiconductor region, the DC voltage is detected by a similar procedure. When the measurement sample 11 is the sample of the p-type semiconductor region, since the CV curve monotonically increases as illustrated in FIG. 5B, each of waveforms of the first order differential curve, the second order differential curve, and the third order differential curve is opposite to that in FIG. 6. However, the DC voltage can be detected by a procedure similar to that described above in reference to FIG. 6.

Summarizing the result of FIG. 6, the feature point is a point between the maximum point and the minimum point of values obtained by second order differentiating with respect to the voltage of the CV curve, when the CV curve monotonically increases or decreases. More specifically, the feature point is the maximum point or the minimum point of a value obtained by first order differentiating with respect to the voltage of the CV curve, and a point obtained by the second order differentiating with respect to the voltage of the CV curve becomes zero, when the CV curve monotonically increases or decreases. Further specifically, the feature point becomes a point in which the absolute value of the slope of the CV curve is maximized or the inflection point of the CV curve, when the probe 4 is placed on the p-type semiconductor region or n-type semiconductor region within the measurement sample 11.

Figure 7:
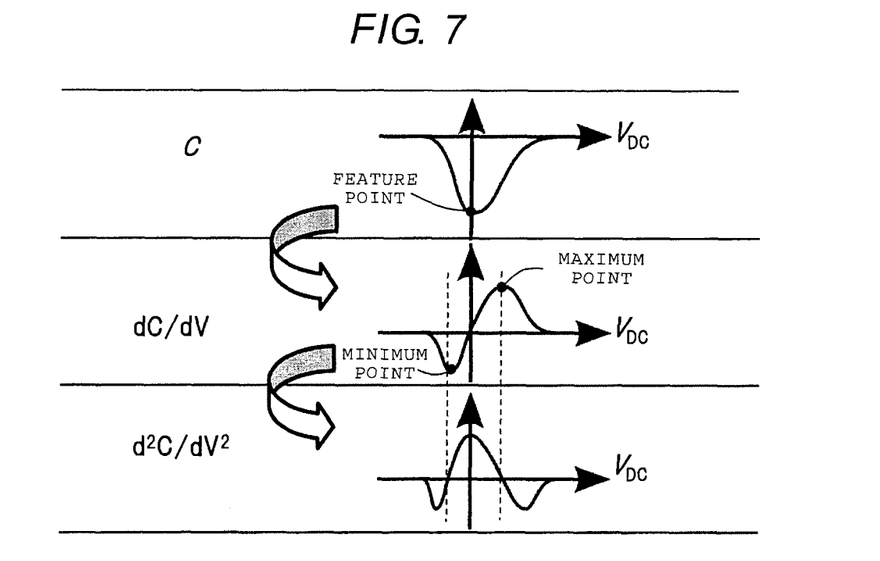
FIG. 7 is a diagram illustrating a process procedure of the feature point voltage detecting unit when the measurement sample has the depletion layer.

FIG. 7 is a diagram illustrating a process procedure of the feature point voltage detecting unit 15 when the measurement sample 11 has the depletion layer. FIG. 7 illustrates the first order differential curve and the second order differential curve in the voltage of the CV curve. The feature point voltage detecting unit 15 detects a point, as the feature point, in which the first order differential curve becomes zero and the second order differential curve becomes a maximum value, and a corresponding voltage value as the DC voltage. The voltage value is equal to the minimum value of the CV curve.

Also, in a case of FIG. 7, in practice, a point slightly shifted from the above-described point may be used as the feature point. That is, the feature point is set at the point between the maximum point and the minimum point of the first order differential curve of the CV curve, when the measurement sample 11 has the depletion layer, as illustrated in the curve of the drawing.

Summarizing the result of FIG. 7, the feature point is a point between the maximum point and the minimum point of values obtained by first order differentiating the CV curve with respect to the voltage, when the CV curve has a peak. More specifically, the feature point is a point obtained by the first order differentiating with respect to the voltage of the CV curve becomes zero and values obtained by the second order differentiating with respect to the voltage of the CV curve becomes the maximum value or the minimum value, when the CV curve has a peak. Further specifically, the feature point is a point in which the slope of the CV curve is minimized, or the minimum point of the CV curve, when the probe 4 is placed on the depletion layer of the measurement sample 11.

Referring to the CV curves depicted in FIG. 6 and FIG. 7, the DC bias voltage can be set to be substantially equal to a difference in voltage between a voltage corresponding to the feature point on the CV curve and the zero voltage. However, this is because it is assumed that the flat band voltage VFB=0 V. When the flat band voltage VFB is not 0 V, the DC bias voltage can be set to be substantially equal to the difference in voltage between the voltage corresponding to the feature point on the CV curve and the flat band voltage VFB.

As described above, in the embodiment, the CV curve is generated by measuring the differential capacitance by using the measurement sample 11, and the voltage value corresponding to the feature point on the CV curve is set as the DC bias voltage. Accordingly, in a state where the DC bias voltage is applied to the measurement sample 11, the electrical characteristics of the measurement sample 11 are measured. With this, even if the surface of the measurement sample 11 is charged due to the effect of the disturbance, it is possible to accurately measure the electrical characteristics of the measurement sample 11. And thus, according to the embodiment, it is unlikely that measurement results vary day by day even in the same measurement sample 11.

In addition, in the embodiment, since a method for setting the DC bias voltage is changed depending on the measurement sample 11 being the sample of the p-type semiconductor region, the sample of the n-type semiconductor region, or the sample having the depletion layer, an optimal DC bias voltage based on a type of the measurement sample 11 can be set, and accuracy improvement of the electrical characteristics of the measurement sample 11 is attained.

In the above description, an example for detecting the DC bias voltage of a case where the differential capacitance is measured in the SNDM 1 is described. However, the embodiment can be applied also when the differential capacitance is measured by using a scanning capacitance microscope (SCM). In addition, the embodiment can be applied also when the differential capacitance is measured by using a scanning probe microscope of other various types.

While certain embodiments have been described, these embodiments have been presented by way of example only, and are not intended to limit the scope of the present disclosure. Indeed, the embodiments described herein may be embodied in a variety of other forms; furthermore, various omissions, substitutions and changes in the form of the embodiments described herein may be made without departing from the spirit of the present disclosure. The accompanying claims and their equivalents are intended to cover such forms or modifications as would fall within the scope and spirit of the present disclosure. Moreover, some or all of the above described embodiments can be combined when implemented.

What is claimed is:

1. A scanning probe microscope comprising:
   a probe;
   a positioning unit configured to position the probe on a measurement sample or a standard sample;
   an excitation unit configured to excite the measurement sample, the standard sample, or the probe at an excitation frequency;
   a resonance unit configured to output a frequency modulation signal obtained by converting a change of a capacitance of the measurement sample or the standard sample into a change of a resonant frequency;
   a frequency demodulator configured to output a demodulated signal obtained by demodulating the frequency modulation signal;
   a lock-in amplifier configured to output a differential capacitance signal obtained by extracting a frequency component and a harmonic component of the excitation frequency included in the demodulated signal;
   a conversion unit configured to output relationship data indicative of a relationship between a voltage applied to the measurement sample or the standard sample and the capacitance, based on the differential capacitance signal;
   a feature point voltage detecting unit configured to determine a feature point of the relationship data; and
   a main measurement control unit configured to (i) select a DC bias voltage based on the determined feature point of the relationship data, and (ii) operate the excitation unit, the resonance unit, the frequency demodulator, and the lock-in amplifier to measure electrical characteristics of the measurement sample in a state where the selected DC bias voltage is applied to the measurement sample.

2. The scanning probe microscope according to claim 1, wherein the conversion unit is configured to output the relationship data as monotonically increasing or decreasing relationship data, and the feature point voltage detecting unit is configured to determine the feature point as a point between a maximum point and a minimum point of values obtained by second order differentiating the monotonically increasing or decreasing relationship data with respect to voltage.

3. The scanning probe microscope according to claim 1, wherein the conversion unit is configured to output the relationship data as monotonically increasing or decreasing relationship data, and the feature point voltage detecting unit is configured to determine the feature point as a point at which a maximum value or a minimum value is obtained by first order differentiating the monotonically increasing or decreasing relationship data with respect to voltage and is zero by second order differentiating the monotonically increasing or decreasing relationship data with respect to voltage.

4. The scanning probe microscope according to claim 1, wherein the conversion unit is configured to output the relationship data as relationship data having a peak, and the feature point voltage detecting unit is configured to determine the feature point as a point between a maximum point and a minimum point of values obtained by first order differentiating the relationship data having a peak with respect to voltage.

5. The scanning probe microscope according to claim 1, wherein the conversion unit is configured to output the relationship data as relationship data having a peak, and the feature point voltage detecting unit is configured to determine the feature point as a point at which a value obtained by first order differentiating the relationship data having a peak with respect to voltage is zero and a value obtained by second order differentiating the relationship data having a peak with respect to voltage becomes a maximum value or a minimum value.

6. A measurement method using a scanning probe microscope, comprising:
   exciting a measurement sample, a standard sample, or a probe, in a state where the probe is positioned on the measurement sample or the standard sample;
   generating a frequency modulation signal obtained by converting a change of a capacitance of the measurement sample or the standard sample into a change of a resonant frequency;
   generating a demodulated signal obtained by demodulating the frequency modulation signal;
   generating a differential capacitance signal obtained by extracting a frequency component and a harmonic component included in the demodulated signal;
   generating relationship data indicative of a relationship between a voltage applied to the measurement sample or the standard sample and a capacitance, based on the differential capacitance signal;
   determining a feature point of the relationship data;
   selecting a DC bias voltage based on the determined feature point of the relationship data;
   applying the selected DC bias voltage to the measurement sample; and
   measuring electrical characteristics of the measurement sample, based on the differential capacitance signal, by sequentially performing excitation of the measurement sample or the probe, generation of the frequency modulation signal, and generation of the differential capacitance signal, while the selected DC bias voltage is applied to the measurement sample.

7. The method according to claim 6, wherein generating the relationship data comprises generating monotonically increasing or decreasing relationship data, and the feature point is a point between a maximum point and a minimum point of values obtained by second order differentiating the monotonically increasing or decreasing relationship data with respect to voltage.

8. The method according to claim 6, wherein generating the relationship data comprises generating monotonically increasing or decreasing relationship data, and the feature point is a point at which a maximum value or a minimum value is obtained by first order differentiating the monotonically increasing or decreasing relationship data with respect to voltage and is zero by second order differentiating the monotonically increasing or decreasing relationship data with respect to voltage.

9. The method according to claim 6, wherein the measurement sample and the standard sample includes a p-type semiconductor region or an n-type semiconductor region on which the probe is placed, and wherein the feature point is a point at which an absolute value of a slope of a curve of the relationship data is maximized, or is an inflection point of the curve.

10. The method according to claim 6,
wherein generating the relationship data comprises generating relationship data having a peak, and the feature point is a point between a maximum point and a minimum point of values obtained by first order differentiating the relationship data having a peak with respect to voltage.

11. The method according to claim 6,
wherein generating the relationship data comprises generating relationship data having a peak, and the feature point is a point at which a value obtained by first order differentiating the relationship data having a peak with respect to voltage is zero and a value obtained by second order differentiating the relationship data having a peak with respect to voltage becomes a maximum value or a minimum value.

12. The method according to claim 6,
wherein the measurement sample and the standard sample include a depletion layer on which the probe is placed, and
wherein the feature point is a point at which a slope of a curve corresponding to the relationship data is minimized, or a minimum point of the curve.

* * * * *